United States Patent [19]

Alonso

[11] Patent Number: 4,598,832
[45] Date of Patent: Jul. 8, 1986

[54] SYSTEM OF COUPLING CYLINDRICAL, SECTIONED CONTAINERS

[76] Inventor: Ildefonso N. Alonso, P.O. Box 6106, Caracas 1010-A, Venezuela

[21] Appl. No.: 670,493

[22] Filed: Nov. 13, 1984

[51] Int. Cl.$^4$ .............................................. B65D 6/24
[52] U.S. Cl. ...................................... 215/6; 215/1 R; 285/371; 220/4 D
[58] Field of Search ................. 215/6, 1 R; 220/4 D; 285/371, 398, 387, 388

[56] References Cited

U.S. PATENT DOCUMENTS

| | | | |
|---|---|---|---|
| 1,064,442 | 6/1913 | Cadigan | 215/6 |
| 2,326,414 | 8/1943 | Thompson | 215/6 X |
| 2,328,543 | 9/1943 | Bauman | 215/1 R |
| 3,348,716 | 10/1967 | Nakata | 215/6 |
| 3,381,980 | 5/1968 | Smith | 285/371 X |
| 3,545,560 | 12/1886 | Levier | 285/371 X |
| 4,444,324 | 4/1984 | Grenell | 215/6 |

Primary Examiner—Donald F. Norton

[57] ABSTRACT

The present invention relates to a system for coupling cylindrical sections to form an assembly of thermal or similar containers, where coupling to form the assembly is effected by an internally threaded connecting ring, normally carried at the base of an upper section, to the exteriorly threaded upper circumference of a lower section. The sections may be separated from one another internally to define chambers of discrete volume by screwing an exteriorly threaded section-separating into the upper and/or lower end of each cylindrical section.

10 Claims, 7 Drawing Figures

SYSTEM OF COUPLING CYLINDRICAL, SECTIONED CONTAINERS

BACKGROUND OF THE DISCLOSURE

Previous to this invention there is no known coupling system of cylindrical sections for containers which provides the advantages of this one.

Cylindrical containers presently known in the market are generally of two types: a first formed entirely of a single unitary longitudinally extensive wall which encompasses a defined volumetric capacity, and a second formed of container sections coupled together to define either a single enclosed volume or a plurality of smaller enclosed, divided volumes (see U.S. Pat. Nos. 2,326,414 and 4,444,324).

SUMMARY OF THE INVENTION

The present invention is concerned with a novel mechanism for coupling two or more containers of the second type. Conventional coupling mechanisms of this second type have proven undesirable because they offer little or no airtightness or stability between the joined or coupled areas. Moreover, uncoupling of the adjoining sections may be achieved inadvertently upon mere rotation of one section relative to the other section, thus resulting in loss of contents within the sections.

The coupling system of the present invention overcomes all the disadvantages of the conventional coupling systems by the provision of a coupling ring disposed externally of, and carried by, one section for connecting the one section to a second section. In this way, precise and hermetic connections of different sections can be achieved with the use of internal connecting rings, and assembly of the container is achieved via threaded external rings. The invention also contemplates varying the container's volumetric capacity as desired, by screwing in internal separation caps or internal connecting rings, thus respectively decreasing or increasing the number of sections practically without limit.

BRIEF DESCRIPTION OF THE DRAWINGS

The present invention will be best understood by referring to the following detailed description when considered in conjunction with the accompanying drawings in which.

DETAILED DESCRIPTION OF THE INVENTION

Figure 1:
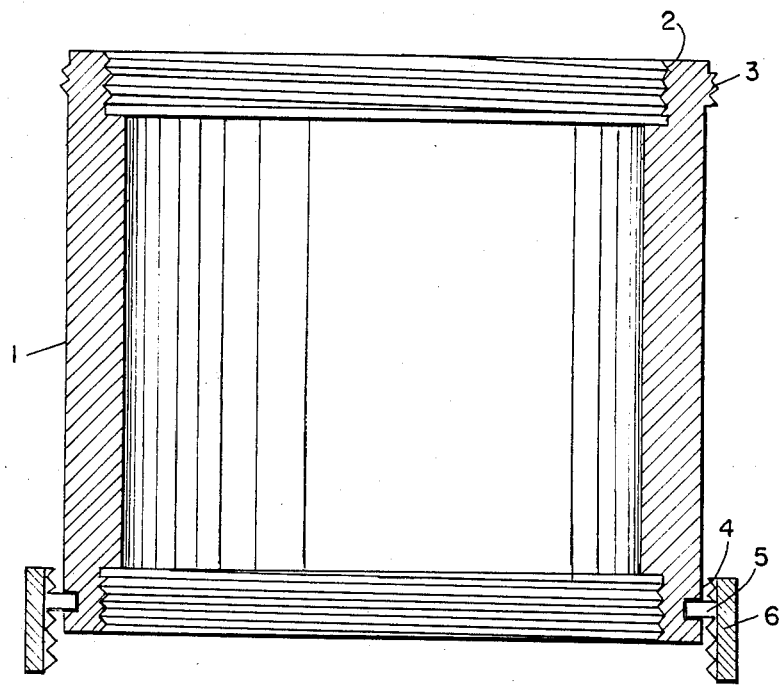
FIG. 1 illustrates a side sectional view of one container section.

Referring first to FIG. 1, the specific form for each container section can be appreciated from the illustrated lateral cross-sectional view taken through the container longitudinal axis of symmetry. Section walls 1 exhibit, at upper and lower regions, a thickness of smaller dimension than the thickness of the walls at middle regions. The upper region defines an internal thread 2 and an external thread 3. The lower region of the section is essentially identical in form to the upper region, except that the external threaded surface is replaced with a circumferential opening 4. This opening is preferably, but not necessarily, of rectangular shape, and houses the holding ring 5 of the external ring 6. The holding ring 5 rotates freely together with the threaded external ring relative to the immediately adjacent lower section wall, while being axially held within the opening of that section.

Figure 2:
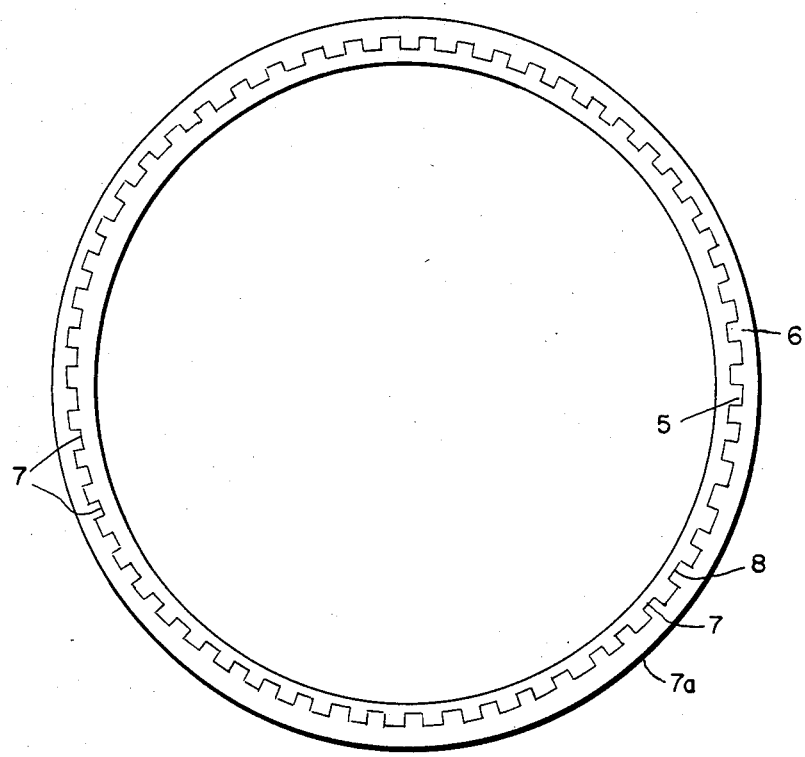
FIG. 2 illustrates an upper plan view of the holding ring of the present invention assembled with the external ring.
Figure 3:
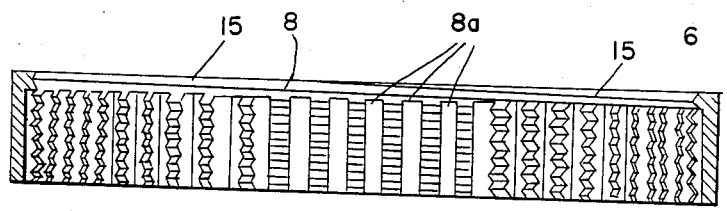
FIG. 3 shows a side sectional view of the external ring.

The specific features of the coupling between the external ring 6 and the holding ring 5 can be more clearly observed with reference to FIG. 2. The holding ring presents a longitudinally extensive cylindrical form and includes about its external surface equidistantly spaced, radially inwardly projecting grooves with outwardly projecting projections 8 therebetween 7. External ring 6 includes, on its inner surface, equidistantly spaced, substantially identical threaded-projections 7a and grooves 8a which are correspondingly configured with the grooves 7 and projections 8 of holding ring 5 for receipt therein with a substantially perfect fit. The upper region of the external ring 6 (see FIG. 3) defines a threaded formation 15 which extends continuously through the internal surface of said ring. The projections 8 of the holding ring 5 assemble with the longitudinal grooves 8a of the external ring, with the grooves 8a terminating at the upper threaded region. The specific coupling between the threaded external ring 6 and the holding ring 5 permits this assembly to rotate upon screwing or unscrewing the external ring relative to the lower section to be connected, while simultaneously permitting longitudinal movement of the external ring, either upwards or downwards, relative to the holding ring, where such downward movement is limited by the upper threaded region 15 of external ring 6, while upward movement of the external ring with respect to the holding ring 5 unscrewed next from the upper external threaded area of its respective section permits removal of the ring 5 from the container section opening 4.

Connection of lower and upper cylindrical sections when using internal separating caps 11 is effected by first screwing each cap 11 into its respective upper and lower container section at the internally threaded region, and then bringing the externally threaded upper region 3 of a lower section into engagement with the holding ring and external ring assembly mounted at the lower region of an upper section and rotating the assembly to screw the external upper region of the lower section thereto. By so doing, the lower section moves longitudinally with respect to the holding ring and both sections are joined in perfect longitudinal alignment. On the other hand, connection of upper and lower cylindrical sections is first effected, when using an internal connecting ring 9 (FIG. 4) by screwing ring 9 into one of the lower section upper region or the upper section lower region, and then screwing the other section's threaded region onto the threaded portion of the ring 9 projecting from the section within which it is first screwed. Thereafter, the external ring 6 including the holding ring is rotated about the upper section while simultaneously being urged longitudinally downwardly along the upper section toward externally threaded region 3 so that as ring 6 is rotated, region 3 is screwed into the ring 6 and the two sections are securely affixed together. External ring 6 therefore acts as a double fixation element which prevents either section from being accidentally unscrewed.

Figure 4:
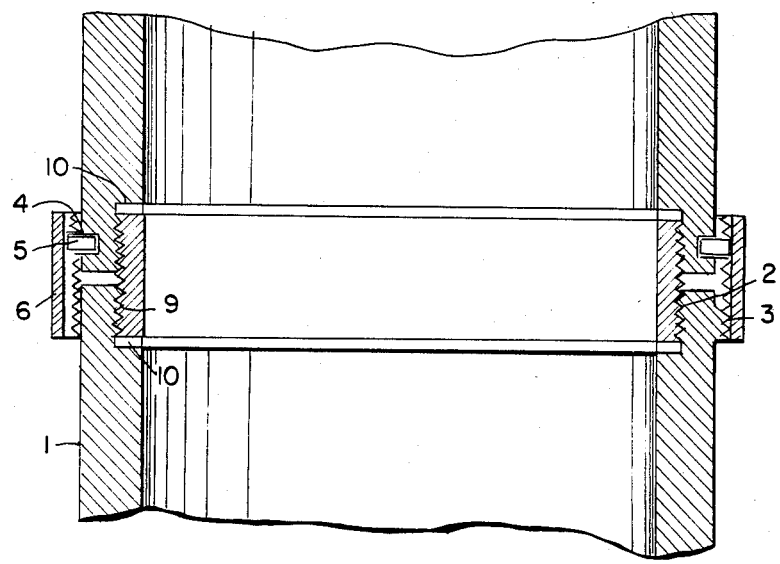
FIG. 4 shows a side sectional view of two joined sections.

Referring more particularly to FIG. 4, there is shown a side sectional view of two sections transversely cut in their middle area, illustrating the essentials of the coupling system for the cylindrical sections.

The internal ring 9, circumferentially threaded throughout its external surface, is first screwed into the lower internal threaded surface of the upper section and then screwed into the upper internal threaded surface of the lower section, perfectly joining both sections and hermetically sealing their interior through the rubber seal rings 10 which adhere against the internal walls of the sections. This latter joining of the ring 9 with the upper internal threaded surfaceof the lower section is followed by rotation of the external ring 6 for effecting a screw-attachment to the external surface of the lower section 3. This internal ring 9 allows for volumetrical communication between both sections.

Figure 5:
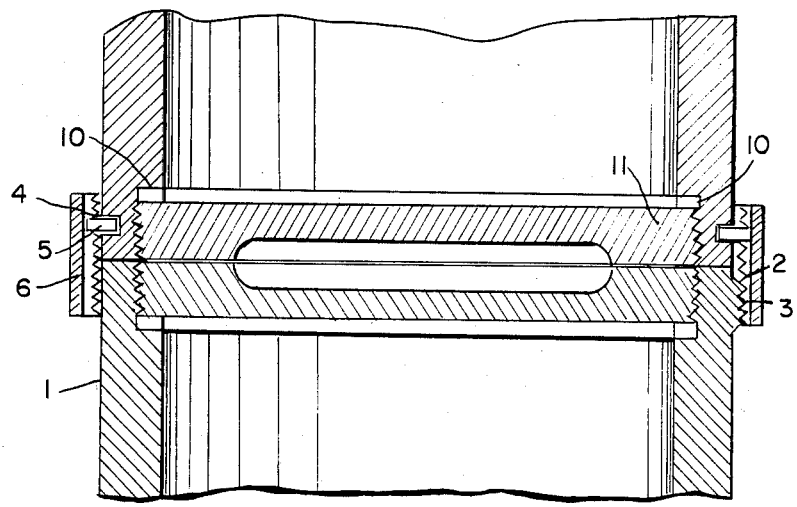
FIG. 5 shows a side sectional view of two joined sections and an internal section separating cap.

In viewing FIG. 5, as well as FIG. 4, an appreciation of the coupling system, incorporating the section-separating internal ring 9 section-enlarging internal cap 11, can be obtained. Like the ring 9, cap 11 includes a circumferentially threaded external surface which fits the lower or upper internal thread of each section.

Each cap 11 is configured to screw precisely into the lower internal threads of an upper section and the upper internal threads of a lower section, and therefore separate the volumetrical cavities of the sections which are connected.

Each cap 11 screws into its respective section individually, pressing with its upper or lower edge that section's seal packing 10, which preferably is in the form of a ring.

Figure 6:
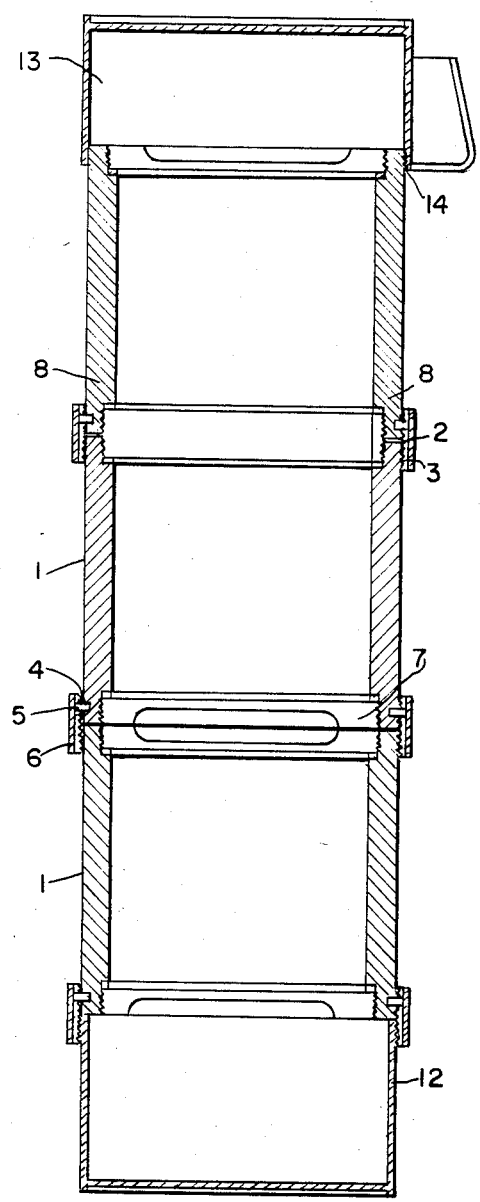
FIG. 6 illustrates a side sectional view of an assembly of containers with internal caps and internal connecting rings.

FIG. 6 depicts the container with three coupled sections as well as a base and the respective capping portion 13. The base 12 is essentially cylindrical, and presents a threaded surface exteriorly of its upper circumference which can be assembled with the threaded external holding ring 6 associated with an upper section. Additionally base 12 performs the function of permitting the internal rings 9 or section separating caps 11 to be stored when they are not being used. The cap or personal use container 13, which presents a circumferentially threaded surface in its lower area 14, couples to the container section located therebelow by being screwed on the upper circumferentially threaded region of that section. As shown in FIG. 6 the two uppermost sections are connected by an internal connecting ring 9 having a circumferentially external threaded surface, while the next lower section and the section above to which it is secured includes the internal separating caps which in turn limit and separate the internal communication of both sections.

Figure 7:
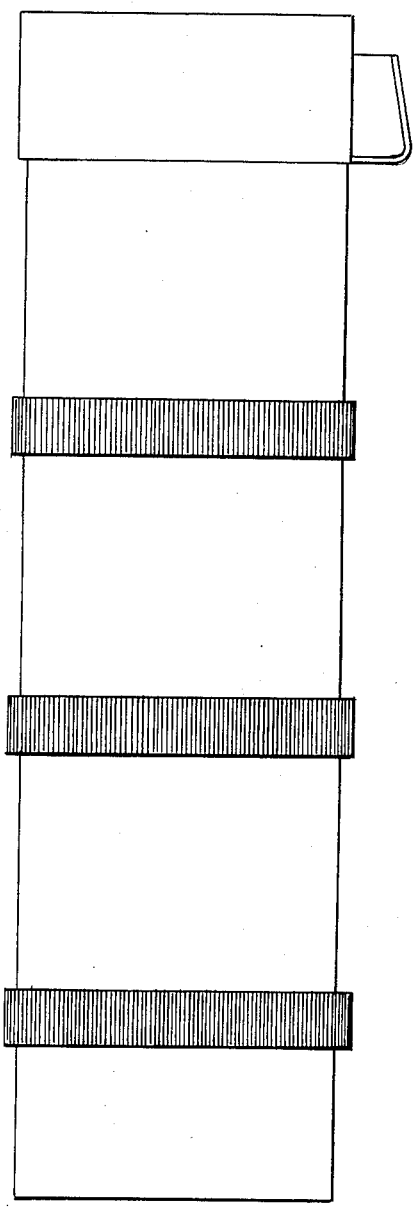
FIG. 7 shows a side view of the assembled container.

FIG. 7 shows the container's shape after the sections have been assembled.

It will be obvious to those skilled in the art that various changes may be made without departing from the scope of the invention and the invention is not to be considered limited to what is shown in the drawings and described in the specification.

What is claimed is:

1. A system for coupling two cylindrical sections of a container, one above the other, comprising:
   first cylindrical means having external threads,
   second cylindrical means having internal threads and including a holding ring fixed within said second cylindrical means against rotation relative thereto;
   said one section having a lower end including circumferentially disposed internal threads and a circumferentially extending external groove;
   said other section having an upper end including internal and external circumferentially extending threads,
   said first cylindrical means engaging at least the internal threads of said one section lower end,
   said second cylindrical means being rotatably mountable on the lower end of said one section via engagement of said holding ring in said groove, said internal threads of said second cylindrical means being engageable with the external threads of said other section upper end, whereby upon rotation of said second cylindrical means relative to said one section, said second cylindrical means internal threads cooperate with said external threads of said other section upper end to secure the latter in firm proximal contact with the lower end of said one section.

2. The system of claim 1 wherein said first cylindrical means defines means for separating the volumes encompassed by said one and said other sections.

3. The system of claim 2, and further comprising packing means for engagement between the upper region of said one section internal threads and the uppermost edge of said first cylindrical means, said packing means defining means for preventing liquid contents in said one section from leaking into said other section.

4. The system of claim 1 wherein said first cylindrical means comprises an annular sleeve and also engages said internal threads of said other section upper end.

5. The system of claim 1 wherein both said one section and said other section are identically configured.

6. The system of claim 1 wherein said second cylindrical means comprises a sleeve and the internal threads of said second cylindrical means extend circumferentially about the inner surface thereof, said inner surface further including a plurality of spaced, radially outwardly directed grooves, each extending longitudinally of said sleeve and normal to said threads, and said holding ring comprises a plurality of spaced, radially outwardly directed projections for cooperative co-action with the grooves of said sleeve inner surface,
   said co-action of said projections within said grooves securing said holding ring against rotation relative to said sleeve while simultaneously permitting movement of said holding ring longitudinally relative to said sleeve, and thus permitting removal of said holding ring from the interior of said sleeve in order to effect disassembly of said coupling figure from said container section.

7. A system for coupling cylindrical sections of containers, comprising:
   a plurality of cylindrical means having external threads and internal threads, and a holding ring fixed within the cylindrical means against rotation relative thereto;
   each cylindrical means having a lower end including circumferentially disposed internal threads and a circumferentially extending external groove;
   each cylindrical means having an upper end including internal and external circumferentially extending threads;

each first cylindrical means engaging at least the internal threads of a lower cylindrical means located under the first cylindrical means;

the lower cylindrical means being rotatably mountable on the lower end of the lower end of the first cylindrical means via engagement of the holding ring in the groove, the internal threads of the lower cylindrical means being engageable with the external threads of the upper end of the first cylindrical means, whereby, during rotation of the lower cylindrical means relative to the first cylindrical means, the internal threads of the lower cylindrical means cooperate with the external threads of the first cylindrical means to secure the latter in firm proximal contact with the first cylindrical means.

8. The system of claim 7 including an external ring perimetrically threaded on the inner surface thereof, which external ring is screwed to the external threaded surface of the upper area of each cylindrical means by freely rotating the ring with respect to the cylindrical means by means of a holding ring around the perimeter of the external ring.

9. The coupling system of claim 7, including separating internal caps with threaded external surfaces, wherein each cap screws into the upper or lower area of its respective cylindrical means, whereby the volumetric capacities of each cylindrical means are separated.

10. A coupling system according to claim 9, including a rubber packing ring located between the end and the lower edges of the internal connecting ring and the lower cylindrical means, preventing leakage between cylindrical means.

* * * * *

UNITED STATES PATENT AND TRADEMARK OFFICE
CERTIFICATE OF CORRECTION

PATENT NO. : 4,598,832
DATED : July 8, 1986
INVENTOR(S) : Ildefonso NOVOA ALONSO It is certified that error appears in the above-identified patent and that said Letters Patent is hereby corrected as shown below:

Title page:

[76] Inventor: Ildefonso NOVOA ALONSO, P.O. Box 6106, Caracas 1010-A, Venezuela

Signed and Sealed this

Twenty-fourth Day of February, 1987

*Attest:*

DONALD J. QUIGG

*Attesting Officer*  *Commissioner of Patents and Trademarks*